United States Patent [19]
Barton, Jr., William M.

[11] 4,183,068
[45] Jan. 8, 1980

[54] MAGNETIC TAPE TRANSPORT MECHANISM

[75] Inventor: William M. Barton, Jr., San Diego, Calif.

[73] Assignee: Cipher Data Products, Incorporated, San Diego, Calif.

[21] Appl. No.: 938,429

[22] Filed: Aug. 31, 1978

[51] Int. Cl.$^2$ .............................................. G11B 15/58
[52] U.S. Cl. ..................... 360/90; 242/182; 226/118
[58] Field of Search .............. 360/90, 71, 93–96; 242/182–185; 226/118

[56] References Cited
U.S. PATENT DOCUMENTS

| | | | |
|---|---|---|---|
| 3,354,318 | 4/1967 | Wahlstrom | 242/184 |
| 3,487,392 | 12/1969 | Lewis | 360/90 |
| 3,645,472 | 2/1972 | Audeh | 242/182 |
| 3,791,607 | 2/1974 | Klang et al. | 242/184 |
| 3,863,863 | 2/1975 | Ende | 242/182 |
| 3,967,319 | 6/1976 | McCollum | 360/90 |
| 4,093,148 | 6/1978 | Uryndwicz et al. | 242/182 |

Primary Examiner—John H. Wolff
Attorney, Agent, or Firm—Brown & Martin

[57] ABSTRACT

The disclosed tape transport mechanism includes within a cabinet, a pair of tape reels, a read/write head, a capstan, a first vacuum column, and a second vacuum column. Each of the vacuum columns have an elongated body, an open end for receiving magnetic tape from a respective one of the tape reels, and a closed end. The first vacuum column is positioned substantially perpendicular to the second vacuum column; and the open end of the second vacuum column is positioned spaced apart from the closed end of the first vacuum column. Further, the capstan is positioned at the open end of the first vacumm column; and the read/write head is positioned along the body portion of the first vacuum column. Each of the vacuum columns lie along a respective one of the cabinet's sides, and no direction changing tape rollers lie anywhere between the vacuum columns.

7 Claims, 2 Drawing Figures

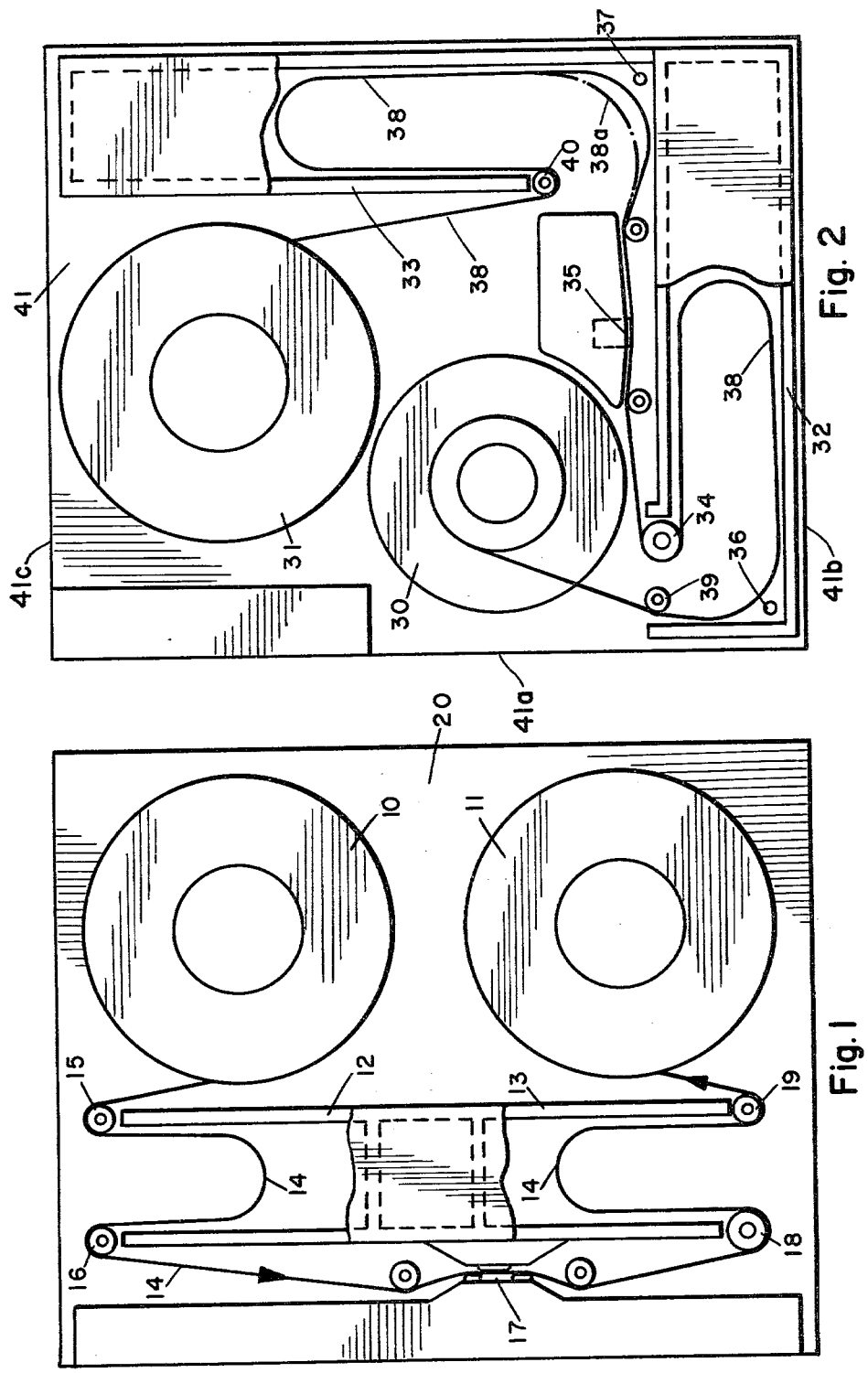

MAGNETIC TAPE TRANSPORT MECHANISM

BACKGROUND OF THE INVENTION

This invention relates to magnetic tape drives, and more particularly to mechanisms for transporting tape across a read/write head in the drives. All tape transport mechanisms include a pair of tape reels. The magnetic tape extends from one of the tape reels across the read/write head and across a capstan to the other tape reel. In operation, the capstan moves the tape across the read/write head at some predetermined velocity. This movement may be either in a forward direction or a backward direction. The patricular direction is determined by command signals that are sent to the drive.

As the capstan changes its velocity from one direction to another, the tape reels also change their direction of movement. However, the capstan has a much lower inertia than that of the tape reels. Therefore, when the tape movement changes from a forward direction to a reverse direction for example, a difference in velocity occurs between the capstan and the tape reels. In order to prevent the tape from tearing due to this difference in velocity, a pair of vacuum columns typically are included in the tape transport mechanism. These vacuum columns are positioned on either side of the capstan between the tape reels.

One of the factors that determines how fast the tape may be accelerated from one direction to the other is the length of the vacuum columns. In general, the maximum allowable acceleration varies directly with the length of the vacuum columns. Another factor that determines how fast the tape movement may be changed is the force exerted on the tape by any roller bearings between the two vacuum columns. These rollers are typically included to shape the tape path. However, a sudden change in velocity of the tape over such a roller produces a tension in the tape; and as the change in tape velocity is increased this tension will eventually cause the tape to tear.

Despite these two limitations on tape transport mechanisms, there exists a demand in the computer industry for reading and writing data from magnetic tapes at higher and higher speeds. Therefore it is one object of the invention to provide an improved tape transport mechanism for a magnetic tape drive.

Another object of the invention is to provide a tape transport mechanism that includes a pair of vacuum columns having no direction changing roller lying therebetween.

Still another object of the invention is to provide a tape transport mechanism having a pair of vacuum columns of maximum length for a tape drive cabinet of a given size.

SUMMARY OF THE INVENTION

These and other objects are accomplished in accordance with the invention by a magnetic tape transport mechanism that is contained in a rectangular shaped cabinet. The mechanism includes a pair of vacuum columns lying perpendicular to each other. The first vacuum column lies along essentially all of the base of the cabinet; while the second vacuum column lies along essentially one of the sides of the cabinet. Thus, the columns have maximum length for a given size cabinet.

The open end of the second vacuum column is positioned spaced from the closed end of the first vacuum column. Further a capstan is positioned at the open end of the first vacuum column; and a read/write head is positioned along the body portion of the first vacuum column.

When tape is moved in the forward direction, it passes from one of the reels into the second vacuum column. Then it turns 90° to run along the side of the first vacuum column and under the read/write head. Next, it turns 180° on the capstan to enter the first vacuum column. From there, the tape is returned to the other tape reel. No direction changing tape rollers lie between the two vacuum columns.

BRIEF DESCRIPTION OF THE DRAWING

Preferred embodiments of the invention disclosed herein will best be understood by referring to the detailed description and the accompanying drawings wherein;

FIG. 1 is a front view of a tape drive including a prior art tape transport mechanism.

FIG. 2 is a front view of a tape drive including a tape transport mechanism constructed according to the invention.

DETAILED DESCRIPTION

In order to better understand the operation and advantages of the disclosed invention, there is illustrated for comparison in FIG. 1, a front view of a prior art tape transport mechanism. This tape transport mechanism includes a pair of tape reels 10 and 11, and a pair of vacuum columns 12 and 13. A magnetic tape 14 extends from reel 10 to a roller 15. From there, tape 14 passes through column 12 in a loop shaped path to a roller 16. Then tape 14 makes a 180° turn, and extends along one of the elongated sides of column 12 to a read/write head 17. From head 17, tape 14 extends to a capstan 28. This capstan is positioned at the open end of vacuum column 13. Tape 14 makes a 180° turn around capstan 18 and extends through column 13 in a loop shaped path. Then tape 14 passes over a roller 19 to a reel 11.

The purpose of the vacuum columns 12 and 13 is to account for differences in acceleration between tape reels 10 and 11, and capstan 18. Due to their relatively large inertia, the tape reels are accelerated at a much slower rate than is the capstan. Thus, for example, when the tape reels are accelerated in a clockwise direction, the loop of tape in column 12 decreases whereas the loop of tape in column 13 increases. An opposite effect occurs when reels 10 and 11 are accelerated in a counter clockwise direction. Thus, one of the factors which limits the capstan acceleration and tape speed is the length of the vacuum columns.

This problem may be dealt with by increasing the length of the vacuum columns. However, eventually a point is reached where the closed ends of the vacuum columns butt against each other. The length of the columns can be further increased by increasing the size of the tape drive cabinet 20. However, this is not esthetically pleasing. In other words, it is desirable to make cabinet 20 as small and compact as possible.

Still another factor which limits the acceleration of capstan 18, and the resulting speed at which tape 14 can be transported across read/write head 17, is the force that is exerted upon the tape by rollers that lie between the vacuum columns and the read/write head. For example, in the illustrated FIG. 1 prior art embodiment, the force exerted by roller 16 on tape 14 would be a limiting factor. As the acceleration of capstan 18 is increased, a tension builds up in the portion of tape 14 lying between read/write head 17 and roller 16. And eventually, a point is reached where that portion of the tape will tear.

Referring now to FIG. 2, a preferred embodiment of the disclosed invention is illustrated. This embodiment has none of the above described limitations. The tape transport mechanism includes a pair of tape reels 30 and 31, and a pair of vacuum columns 32 and 33. Vacuum column 32 is positioned substantially perpendicular to vacuum column 33. Further, the two vacuum columns are offset from one another such that the open end of vacuum column 33 is spaced apart from the closed end of vacuum column 32.

A capstan 34 is positioned at the open end of vacuum column 32. And a read/write head 35 is positioned along the body portion of that vacuum column. Further, a vent 36 exists at the open end of column 32; and another vent 37 exists at the open end of column 33. These vents provide a means for creating a localized vacuum which in turn sucks the tape 38 toward the vent. They thus provide "frictionless bearings" on which tape 38 turns in route to the vacuum columns. Vent 37 also acts to create a "small vacuum column" that aids in the forward acceleration of the tape as described below.

The actual path of the tape through the transport mechanism is illustrated by following reference numeral 38. Starting from reel 31, the tape passes over a roller 40 into vacuum column 33. From there, the tape makes a 90° turn to read/write head 35. Then the tape makes a 180° turn around capstan 34, and extends into vacuum column 32. Next, it passes past vent 36 and back to reel 31.

One important point about this tape transport mechanism, is that the length of vacuum columns 32 and 33 may be made to extend along a substantial portion of the sides and base of tape drive cabinet 41. Another important point is that the disclosed tape transport mechanism requires no tape roller anywhere between the entrance of column 33 and the exit of column 32. Still another important point is that vent 37 allows the initial forward movement of tape 38 to occur without moving any of the tape loop in column 33 the tape simply moves away from the vent as indicated via reference numeral 38a. Due to these conbined features, the tape may be moved at substantially greater accelerations and velocities by this mechanism, for a given size cabinet, than in the prior art. For example, the prior art mechanism of FIG. 1 operates at a maximum tape speed of 75 inches per second; whereas the disclosed mechanism of FIG. 2 operates at a maximum tape speed of 125 inches per second. This is a substantial performance improvement.

Several variations to the FIG. 2 embodiment may also be made without departing from the nature and spirit of the invention. For example, the entire tape transport mechanism may be rotated 90° such that column 32 extends along the side 41a of cabinet 41 while column 33 extends along the base of 41b of the cabinet. Alternatively, the entire tape transport mechanism may be rotated 180° such that column 32 extends along the top 41c of the tape drive cabinet. Further, it is to be understood that the exact dimensions of the length and width of the cabinet are unimportant. Because for a given cabinet size, the amount of tape on either side of the read/write head to the nearest tape roller will be substantially greater in the disclosed transport mechanism than in the prior art. Therefore, since many changes and modifications can be made to the preferred embodiment of FIG. 2 without departing from the nature and spirit of the invention, it is to be understood that the invention is not limited to those details but is defined by the appended claims.

I claim:

1. A magnetic tape drive comprising a cabinet having a face containing a pair of tape reels, a read/write head, a capstan, a first vacuum column, and a second vacuum column; each of said vacuum columns having an elongated body, an open end for receiving a loop of magnetic tape from a respective one of said tape reels, and a closed end; wherein said first vacuum column is positioned substantially perpendicular to said second vacuum column, said capstan is positioned at the open end of said first vacuum column, said read/write head is positioned along the body portion of said first vacuum column, and the open end of said second vacuum column is positioned spaced apart from the closed end of said first vacuum column, the forward direction of said tape being from said second vacuum column then along said body portion of said first vacuum column and then around said capstan to said first vacuum column with no direction changing rollers lying between the entrance of said vacuum column and exit of said first vacuum column to limit the acceleration of said tape.

2. A magnetic tape drive according to claim 1, wherein the face of said cabinet is rectangular having a base, a top, and two sides; and wherein the elongated portion of said first vacuum column lies along a substantial portion of said base, and said elongated portion of said second vacuum column lies along a substantial portion of one of said sides.

3. A magnetic tape drive according to claim 1, wherein the face of said cabinet is rectangular having a base, a top, and two sides; and wherein the elongated portion of said first vacuum column lies along a substantial portion of one of said sides; and said elongated portion of said second vacuum columns lies along a substantial portion of said base.

4. A magnetic tape drive according to claim 1, wherein the face of said cabinet is rectangular having a base, a top, and two sides; and wherein the elongated portion of said first vacuum column lies along a substantial portion of said top; and said elongated portion of said second vacuum column lies along a substantial portion of one of said sides.

5. A magnetic tape drive according to claim 1, wherein the face of said cabinet is rectangular having a base, a top, and two sides; and wherein the elongated portion of said first vacuum column lies along a substantial portion of the elongated portion of one of said sides; and said elongated portion of said second vacuum column lies along a substantial portion of said top.

6. A magnetic tape drive according to claim 1, and further including a vacuum vent at the open end of said first vacuum column for sucking tape from one of said reels toward said vent, and a vacuum vent at the open end of said second vacuum column for sucking tape from said read/write head toward said vent.

7. A method for transporting a magnetic tape across a read/write head comprised of the steps of;
transporting said tape from a first tape reel in a loop shaped path through a first vacuum column; then
transporting said tape from said first vacuum column over a capstan to make a 180° turn in said tape; then transporting said tape from said capstan over a read/write head positioned along the body portion of said first vacuum column; then transporting said tape from said read/write head in a loop shaped path through a second vacuum column positioned substantially perpendicular to said first vacuum column; and then transporting the tape from said second vacuum column to a second tape reel, the forward directions of said tape being from said second vacuum columns then along said body portion of said first vacuum columns and then around said capstan to said first vacuum columns with no direction changing rollers lying between the entrance of said second vacuum columns and exit of said first vacuum columns to limit the acceleration of said tape.

* * * * *